United States Patent [19]
Marino

[11] Patent Number: 4,698,023
[45] Date of Patent: Oct. 6, 1987

[54] CONNECTING BLOCKS

[76] Inventor: Joseph A. Marino, South Ryland Rd., P.O. Box 306, Whitehouse, N.J. 08888

[21] Appl. No.: 857,975

[22] Filed: May 1, 1986

[51] Int. Cl.[4] .................. G09B 1/36; A63H 33/08
[52] U.S. Cl. ............................ 434/259; 434/403; 446/125
[58] Field of Search .............. 434/259, 403; 446/121, 446/125

[56] References Cited
U.S. PATENT DOCUMENTS
3,374,917  3/1968  Troy .......................... 446/125 X Primary Examiner—William H. Grieb
Attorney, Agent, or Firm—Paul Maleson

[57] ABSTRACT

A toy building block and a interactive set of said toy building blocks. Each side of each block is provided with a shape, either raised or recessed. There are three such shapes. Each block has at least one face with each of said shapes. There is only one raised shape portion on each block. The raised portions have a removable snap fit to matching recessed portions on other blocks.

A plurality of said blocks, comprising a set, may be assembled by a child to form three dimensional structures. The half portion of each block opposing that side having the raised shape portion is identical to the opposing one half portion of every other block of the set.

9 Claims, 4 Drawing Figures

U.S. Patent  Oct. 6, 1987  4,698,023
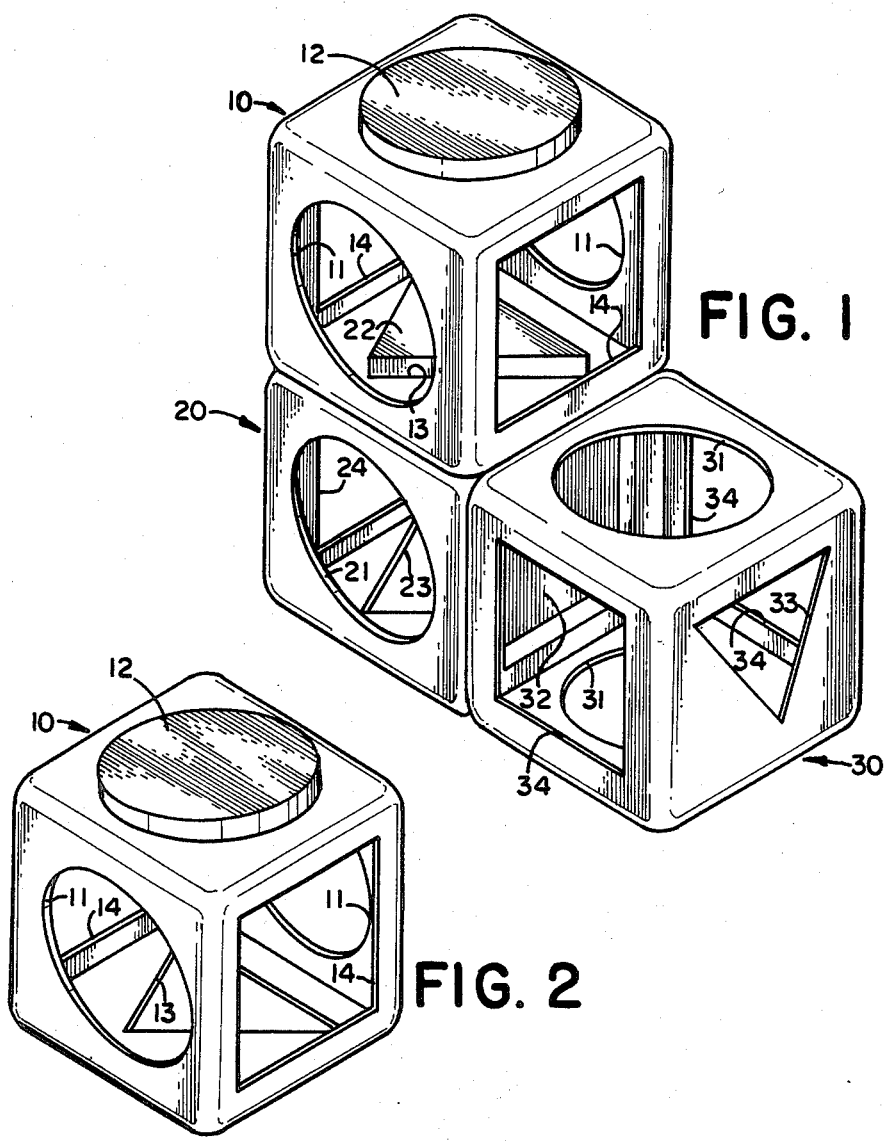
FIG. 1
FIG. 2
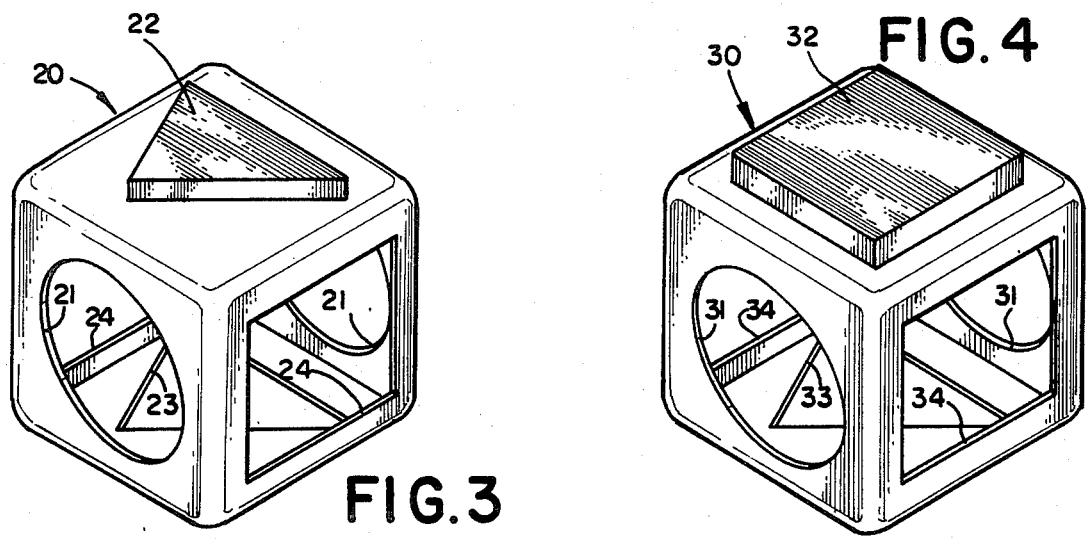
FIG. 3
FIG. 4

CONNECTING BLOCKS

BACKGROUND OF THE INVENTION

1. Field of the Invention

This invention relates to toy construction or building blocks, particularly suitable for younger children. More particularly, it relates to such blocks that have an educational value in teaching shape recognition, and three dimensional visualization and activities. The blocks are also suited for economical production.

2. Prior Art

Molded plastic construction blocks for use by children are well known. Such blocks have been known to have keying or matching parts so the blocks may fit together. It has also been known to provide educational toys and devices for children to teach shape recognition. Such toys include surfaces having openings of different shapes in combination with individual pieces having corresponding different shapes, so that only the proper piece passes through a given opening.

Hollow blocks have been known, as well as blocks having raised or recessed indicia on their surfaces. It is not believed, however, that it has been known to provide a set of blocks having the particular advantages of both manufacture and use in the present invention.

SUMMARY OF THE INVENTION

A set of toy building or construction blocks is provided. In a preferred embodiment, the blocks are molded of hollow thermoplastic material. Three different types of blocks are included in a set. A minimum set of nine blocks, consisting of three duplicates of each of the three types, has been found to be a useful and convenient set. It is understood however, that the inventive contribution lies in the structure of any single block of the set as well as the operative combination of a set of three or more.

A block is square, and has five sides provided with cut-out or opening or recess, and one side with a raised portion. Each block of a set has the same general overall nominal dimensions and is a square block. There are three different shapes on the surfaces of each block, either recessed or raised. These shapes are a circle, a square, and a triangle. Each block has a pair of each of the shapes; a shape on each of the six surfaces of each block.

In each one of the three different types of block, a different shape is made the raised shape on a surface. Thus, a block will have two pairs of recessed shapes and a third pair consisting of one recessed and one raised shape.

A raised shape on one surface of a block fits into any recessed shape of the same type description (i.e., square, circle, triangle) on any other block. The molding dimensions are such that there is an easy snap fit. Assembled blocks stay in place together but may be easily disassembled by light pulling force. All or some of the blocks of a set may be assembled, forming a three dimensional structure at will.

The child must discriminate between matching and non-matching shapes, and must demonstrate some degree of manual dexterity in handling the blocks. A reinforcing reward is the building of a structure.

The set of blocks is particularly adapted to economical manufacture. Each block is made from two halves. The halves are molded separately and are adhered together to form a complete block by any conventional means, such as gluing or heat sealing. There are thus six halves needed to make three different blocks, but only four different molds are needed. Each block has an identical "bottom" half. The "top" half of each block contains the raised shape surface and since there is a different raised portion on each of the three fundamental types of blocks, a separate mold is needed for each.

BRIEF DESCRIPTION OF THE DRAWINGS

FIG. 1 is a perspective view of an assembly of three blocks of the set;

FIG. 2 is a perspective view of one type of block of the set;

FIG. 3 is a perspective view of another type of block of the set; and

FIG. 4 is a perspective view of the third type of block of the set.

DESCRIPTION OF THE PREFERRED EMBODIMENT

The invention is best initially described in connection with FIG. 2. Thereafter, the description of the blocks as shown in FIGS. 3 and 4 varies only slightly from the description in connection with FIG. 2.

The block, described for ease of reference as the raised circle block is generally designated 10. It is the general cubicle configuration and has five sides provided with a cut out or opening or recess as described below, and as shown, one side has a raised portion 12. In the block of FIG. 2, this raised portion is a raised circular portion 12.

There are three different shapes on the surfaces of the block, either recessed or raised. These shapes are the raised circular portion 12, an opposing pair of recessed circles 11, and an opposing pair of recessed squares 14, and a recessed triangle 13, opposing the raised circular portion 12.

The block as shown in FIG. 2 is preferably hollow and is molded of common thermoplastic material, such as polypropylene, polyethylene, polystyrene, for example.

The block is preferably hollow so that what are described as recesses 11, 13, and 14 are actually molded cut-out sections in their respective faces or sides of the block 10.

An important aspect of the invention is related to economical manufacture of the block. Each block is molded in two halves. With reference to FIG. 2, the line separating the two molded halves would be a horizontal line running around four faces of the block through a circular recess, a square recess, another circular recess, and another square recess, at the vertical midpoints of those faces. This join line is not drawn in the figure, since to the user of the block, the particular location of the mold half join line is immaterial. From the point of view of manufacture, it is noted that the bottom half contains the triangular recess or cut-out 13. The importance of this will become apparent when the remaining figures are discussed. The halves are molded separately and are adhered together to form a complete block by any conventional means, such as gluing or heat sealing.

FIG. 3 discloses a raised triangle block generally designated 20. The upper face or side has a raised triangle portion 22. The opposing bottom face has a recessed triangle portion 23. The remaining sides have pairs of opposed recessed circles 21 and a pair of recessed squares 24. All other comments made in connection with FIG. 2 apply to the block of FIG. 3 also.

FIG. 4 is a raised square block generally designated 30. The upper side or face has a raised square portion 32. The opposing lower face has a recessed triangle 33, and the remaining sides have opposed pairs of recessed circles 31 and recessed squares 34. The other comments made in connection with the block of FIG. 2 apply to the block of FIG. 4 also.

It is important to note that in each of the blocks of FIGS. 2, 3, and 4, the bottom half is identical; it includes a recessed triangle, and one half of a pair of recessed circles and one half of a pair of recessed squares. It is thus apparent that a separate mold must be provided only for the three different top halves of the blocks, and a common single mold suffices for the bottom half of each block. The result is that three different blocks, made with a total of six molded halves, require only four different mold cavities. This is a valuable economic advantage.

The manner in which the blocks are assembled to form structures is illustrated in its most primitive form in FIG. 1. In FIG. 1, the simplest type of assembly is shown using one each of each of the three blocks of the types of FIGS. 2, 3 and 4. The blocks are made so that the raised shape on one surface of a block fits into a recessed shape of the same type description (that is, square to square, circle to circle, triangle to triangle) on any other block. The molding dimensions are such that there is an easy snap fit. Assembled blocks stay in place together but may be easily disassembled by a light pulling force.

In the preferred embodiment, it has been found that a useful minimum set comprises nine blocks, consisting of three duplicates of each of the three types. It is understood however that the number of blocks in a set is not in itself a limiting factor in the inventive concept. All or some of the blocks of a set may be assembled, forming a three dimensional structure at will. The structure may of course be easily modified by the user, usually and by intention a child.

The child must discriminate between matching and non-matching shapes and must demonstrate a degree of manual dexterity in handling the blocks. The blocks may conveniently be made of brightly colored plastics of different hues.

There is an educational value in these blocks as well as an amusement value. A reinforcing reward is the esthetic pleasure of building a three dimensional structure which has stability, but which may be modified at will. The blocks are of course light by reason of being hollow, and as shown, their edges and corners are preferably slightly rounded. These factors contribute to the safety of the blocks.

I claim:

1. A toy building block having one side provided with a raised portion and the remaining sides provided with recessed portions, said portions each being of one of three different shapes, and there being at least one recessed portion of each of said three different shapes wherein the side of said block opposing said side having said raised shape portion has a recessed shape portion, said recessed shape portion being the only representative of said shape on any side of said block.

2. A toy building block as set forth in claim 1 wherein the remaining sides of said block comprise two opposed pairs of recessed shapes, each pair being the same shape and differing from the shape of said other pair.

3. A toy building block as set forth in claim 2 wherein said block is hollow and said recesses are cut-outs in the respective sides of said block.

4. A toy building block as set forth in claim 3 wherein said three different shapes are a square, a circle, and a triangle.

5. A plurality of toy building blocks, comprising a set, each of said blocks as set forth in claim 2, wherein the raised portion on one block of said set is dimensioned to have a snap fit, hand removable and insertable, with at least one recess of the same shape on any other block of said set.

6. A set of blocks as set forth in claim 5 wherein each block of said set has the one half portion thereof opposed to the side having said raised shape portion identical to said opposed one half portion of each block of said set.

7. A set of blocks as set forth in claim 6 wherein each of said blocks is made of molded plastic, and each of said one half portions of each of said block are made of separately molded portions adhered together.

8. A set of toy blocks as set forth in claim 7 wherein each of said blocks of said set is hollow and each of said recessed portions in each of said blocks is a cut-out portion of a side of each of said blocks.

9. A set of toy blocks as set forth in claim 8 wherein said shapes are respectively a circle, a triangle, and a square, and the minimum number of different blocks in said set is three, with at least one block having a raised circle portion, at least one block having a raised triangle portion and at least one block having a raised square portion.

* * * * *